(12) United States Patent
McGehee

(10) Patent No.: US 7,722,109 B1
(45) Date of Patent: May 25, 2010

(54) MULTIDIRECTIONAL AUXILIARY SUN VISOR AND METHOD OF USE THEREOF

(76) Inventor: Bruce McGehee, 60 Perimeter Center Pl., #224, Dunwoody, GA (US) 30346

( * ) Notice: Subject to any disclaimer, the term of this patent is extended or adjusted under 35 U.S.C. 154(b) by 0 days.

(21) Appl. No.: 12/496,909

(22) Filed: Jul. 2, 2009

(51) Int. Cl.
*B60J 3/02* (2006.01)
(52) U.S. Cl. .................................................. 296/97.6
(58) Field of Classification Search ............... 296/97.1, 296/97.6, 97.8; 160/370.21, DIG. 3
See application file for complete search history.

(56) References Cited

U.S. PATENT DOCUMENTS

| | | | | |
|---|---|---|---|---|
| 1,965,839 A | * | 7/1934 | Holt | 296/97.6 |
| 2,542,409 A | * | 2/1951 | Guenther | 296/97.6 |
| D298,427 S | * | 11/1988 | Jonsas | D12/191 |
| 4,792,176 A | | 12/1988 | Karford | |
| 4,828,314 A | | 5/1989 | Gavagan | |
| 4,950,021 A | * | 8/1990 | Vandagriff | 296/97.6 |
| 4,978,160 A | | 12/1990 | Welschoff | |
| 5,427,427 A | | 6/1995 | Holter | |
| 5,472,255 A | | 12/1995 | Moore | |
| 5,611,591 A | * | 3/1997 | Van Devender | 296/97.6 |
| 5,626,381 A | | 5/1997 | Gervasoni et al. | |
| 5,673,957 A | | 10/1997 | Moo et al. | |
| 5,749,618 A | | 5/1998 | Jones | |
| 5,829,816 A | * | 11/1998 | Cimmino | 296/97.6 |
| 6,012,758 A | | 1/2000 | Fisher | |
| 7,077,454 B1 | * | 7/2006 | Schambre | 296/97.8 |
| 7,344,176 B2 | * | 3/2008 | Maharaj | 296/97.6 |
| 7,540,553 B1 | * | 6/2009 | Mullis | 296/97.8 |
| 2002/0038959 A1 | | 4/2002 | Francis et al. | |
| 2005/0230998 A1 | * | 10/2005 | Im | 296/97.6 |
| 2006/0076796 A1 | | 4/2006 | Kumakawa et al. | |
| 2006/0125277 A1 | | 6/2006 | Maharaj | |
| 2008/0315616 A1 | | 12/2008 | Wang | |

FOREIGN PATENT DOCUMENTS

| | | |
|---|---|---|
| CA | 2251495 | 5/2000 |
| DE | 3833625 | 4/1990 |
| EP | 0400552 A1 | 12/1990 |
| FR | 2637850 | 4/1990 |
| KR | 20020049646 | 6/2002 |
| KR | 20030008919 | 1/2003 |
| WO | WO2005084977 | 9/2005 |

* cited by examiner

*Primary Examiner*—H Gutman
(74) *Attorney, Agent, or Firm*—Williamson Intellectual Property Law, LLC; Thomas R. Williamson, III

(57) ABSTRACT

A multidirectional auxiliary sun visor having a main panel and a folding panel, wherein the folding panel may pivot in three directions. The auxiliary sun visor may be removably secured to an existing vehicular sun visor by utilizing hook-and-loop fasteners, or alternatively, elastic straps. An auxiliary sun visor may have pivot clips on the peripheral edges of a main panel dimensioned to receive a U-shaped frame that extends around a portion of the periphery of a folding panel. A set of pivot clips may be selected and unclipped allowing the folding panel to pivot in a direction determined by the remaining pivot clip. This provides the user with the ability to easily select an area in which to position an auxiliary sun visor to prevent sun glare in compliment to an existing vehicular sun visor.

18 Claims, 4 Drawing Sheets

MULTIDIRECTIONAL AUXILIARY SUN VISOR AND METHOD OF USE THEREOF

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to vehicular sun visors, and more specifically to a multidirectional auxiliary sun visor with a folding panel and pivot clips adaptable to provide a user with the ability to select a variety of directions or areas in which visor can be positioned to prevent sun glare from obscuring vision of the roadway while driving.

2. Description of Related Art

Vehicular sun visors typically comprise a single panel affixed to an L-shaped support rod, wherein the panel can extend downward from the support rod to block glare from the sun entering through the front glass, and alternatively the support rod can pivot, wherein the panel can block glare from the sun entering from the side of the vehicle. The panel can be pivoted upward in contact with a headliner of the vehicle when not in use.

Some models of vehicles have an additional vertical slidable panel capable of extending toward the center of the vehicle to block glare from the sun entering through the space remaining between the primary panel and the rear-view mirror. Although the slidable panel provides some additional coverage, it is inadequate to fully block glare in all instances. Therefore, a number of auxiliary devices have been conceived to accommodate the shortcomings of the factory installed sun visor.

An examination of the prior auxiliary devices demonstrates a variety of means offered to fulfill the need for additional protection from glare from the sun. One such device is a sun visor extender comprised of a support bar secured to an existing sun visor by means of elastic straps. The support bar comprises magnets which cooperate with magnets on an extender to secure a shield exposed downward from the existing sun visor. This device offers additional protection, but lacks versatility to cover areas other that those directly below the existing visor.

Another prior auxiliary device is a visor adapted to be secured to an existing sun visor, wherein the auxiliary visor comprises an additional L-shaped support rod secured to an existing panel by means of elastic straps. The auxiliary panel can extend downward from an existing panel or alternatively may pivot to cover an area to one side and below an existing panel. Although this panel offers more versatility than the previous device, it fails to offer protection from sun glare entering toward the center of the vehicle front glass. That is, it is restricted to providing coverage for only one side.

Yet another prior auxiliary device, is a visor unit comprising a series of slidable panels adapted to slide vertically or horizontally from the existing visor. Although this device purports to offer coverage in three directions extending from the existing visor, the horizontal slidable panel extending toward a vehicle support column provides little benefit, in the absence of a means to pivot independent of an existing visor to cover the vehicle side window.

Currently, available auxiliary sun visors lack the versatility to protect an occupant from glare from the sun in three directions, including a side window, with a single panel.

Therefore, it is readily apparent that there is a need for a multidirectional auxiliary sun visor with the adaptability for pivoting in a variety directions or covering different areas to prevent glare from the sun obscuring the vehicle occupant's vision.

BRIEF SUMMARY OF THE INVENTION

Briefly described, in a preferred embodiment, the present invention overcomes the above-mentioned disadvantages and meets the recognized need for such a device by providing a multidirectional auxiliary sun visor comprising a main panel with pivot clips that operatively couple with a rotating rod member, and a folding panel adaptable to pivot in three directions to protect a vehicle occupant from sun glare entering the vehicle. This provides the vehicle occupant with the ability to position a single panel in one of three areas in which sun glare may otherwise enter and obscure vision.

According to its major aspects and broadly stated, the present invention in its preferred form is a multidirectional auxiliary sun visor having a main panel removably secured to an existing vehicle sun visor by means of a securing device. The securing device may be, for exemplary purposes only and without limitation, hook-and-loop fasteners or elastic straps, wherein the main panel has pivot clips disposed on at least three sides thereof, and wherein the pivot clips are dimensioned to receive and removably retain a U-shaped frame, and wherein the U-shaped frame is in communication with a folding panel. The pivot clips provide the occupant with a means to pivot a single folding panel in three directions, to protect a vehicle occupant from sun glare. By removing the U-shaped frame from selected pivot clips, the folding panel can be positioned horizontal to an existing sun visor to block sun glare from entering through a side window or toward the center of the vehicle, or can be positioned vertical to an existing sun visor to block sun glare from entering below the existing vehicle sun visor.

An alternate embodiment of the present invention is a multidirectional auxiliary sun visor having a main panel secured to an existing sun visor, wherein the main panel is in communication with a U-shaped frame having a cylindrical rail or cylindrical rails disposed on a folding panel. Further, the folding panel is in communication with pivot clips on the main panel, wherein the pivot clips are dimensioned to receive the cylindrical rails of the U-shaped frame. It will be recognized by those skilled in the art that alternatively the main panel could have cylindrical rails disposed thereon, to which pivot clips disposed on the folding panel are removably secured.

A further alternate embodiment of the present invention is a multidirectional auxiliary sun visor having pivot clips disposed on an existing sun visor, wherein the pivot clips are dimensioned to receive cylindrical rails of a U-shaped frame that is in communication with a folding panel, thereby eliminating the need for a main panel.

More specifically, the present invention is a multidirectional auxiliary sun visor removably secured to an existing sun visor using a securing device, such as hook-and-loop fasteners. In the preferred embodiment, the cooperative halves of the hook-and-loop fasteners are disposed on separate strap members that pass behind the existing sun visor, wherein the halves of the hook-and-loop fasteners are subsequently joined together.

In an alternate embodiment, a first portion of at least one hook-and-loop fastener may be secured to a front portion of an existing sun visor and a second portion of at least one hook-and-loop fastener may be secured to a rear portion of a main panel. The first portion and the second portion of the at least one hook-and-loop fastener cooperatively engage to secure the multidirectional auxiliary sun visor to an existing sun visor.

A number of pivot clips are disposed on at least three peripheral sides of the main panel, including a top side, a left side, a bottom side, and a right side, wherein the pivot clips are dimensioned to receive and removably retain cylindrical rails of a U-shaped frame disposed, wherein the cylindrical rails are disposed along a principal part of the full dimension of the U-shaped frame in contact with a folding panel. Further, the cylindrical rails may have stiffening members thereon that bind, grip or tighten the rotation of the cylindrical rails within the pivot clips to reduce the tendency of the cylindrical rails to pivot within the pivot clips under the weight of the folding panel or under centrifugal force. An occupant may select pivot clips to unclip from at least two of a left side, a bottom side, and a right side of a main panel, thereby allowing manual selective positioning of the folding panel by the user according to the remaining pivot clip, thereby protecting the occupant from sun glare entering the vehicle at a selected location.

In an alternative embodiment, a multidirectional auxiliary sun visor may be removably secured to an existing sun visor with a securing device, such as hook-and-loop fasteners. The main panel may have a U-shaped frame disposed along a portion of the main panel's full dimension, wherein the U-shaped frame has cylindrical rails. The cylindrical rails may further have stiffening members to reduce the tendency of cylindrical rails to pivot within pivot clips under the weight of the folding panel or centrifugal forces, as described hereinabove. The folding panel may have pivot clips disposed on at least three peripheral edges thereof, including a left edge, a bottom edge, and a right edge. The pivot clips are dimensioned to receive the cylindrical rails of the U-shaped frame. An occupant may select pivot clips to unclip from at least two of the left edge, the bottom edge, and the right edge, thereby allowing the folding panel to be manually positioned according to the remaining pivot clips along a single remaining edge to protect the occupant from sun glare entering the vehicle at a selected location.

In a further alternative embodiment, a multidirectional auxiliary sun visor may have a number of pivot clips disposed on at least three peripheral edges of a existing sun visor, including optionally a top side, a left side, a bottom side, and a right side, wherein the pivot clips are dimensioned to receive cylindrical rails of a U-shaped frame, wherein the U-shaped frame is disposed along its full dimension proximate a folding panel. Further, the cylindrical rails may have stiffening members as described hereinabove to reduce the tendency of the cylindrical rails to pivot within the pivot clips. An occupant may select pivot clips to unclip from at least two of the left side, the bottom side, and the right side, thereby allowing the folding panel to be manually positioned according to the remaining pivot clips disposed along a single side to protect the occupant from sun glare entering the vehicle.

Accordingly, a feature and advantage of the present invention is its ability to be easily secured to an existing vehicle sun visor.

Another feature and advantage of the present invention is its ability to position a single panel in three different positions to protect a vehicle occupant from sun glare.

Still another feature and advantage of the present invention is its ability to pivot a single panel to eliminate the need for additional panels.

Yet a further feature and advantage of the present invention is that the folding panel can be easily replaced if worn or damaged.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The multidirectional auxiliary sun visor will be better understood by reading the Detailed Description of the Preferred and Selected Alternate Embodiments with reference to the accompanying drawing figures, in which like reference numerals denote similar structure and refer to like elements throughout, and in which.

Figure 1:
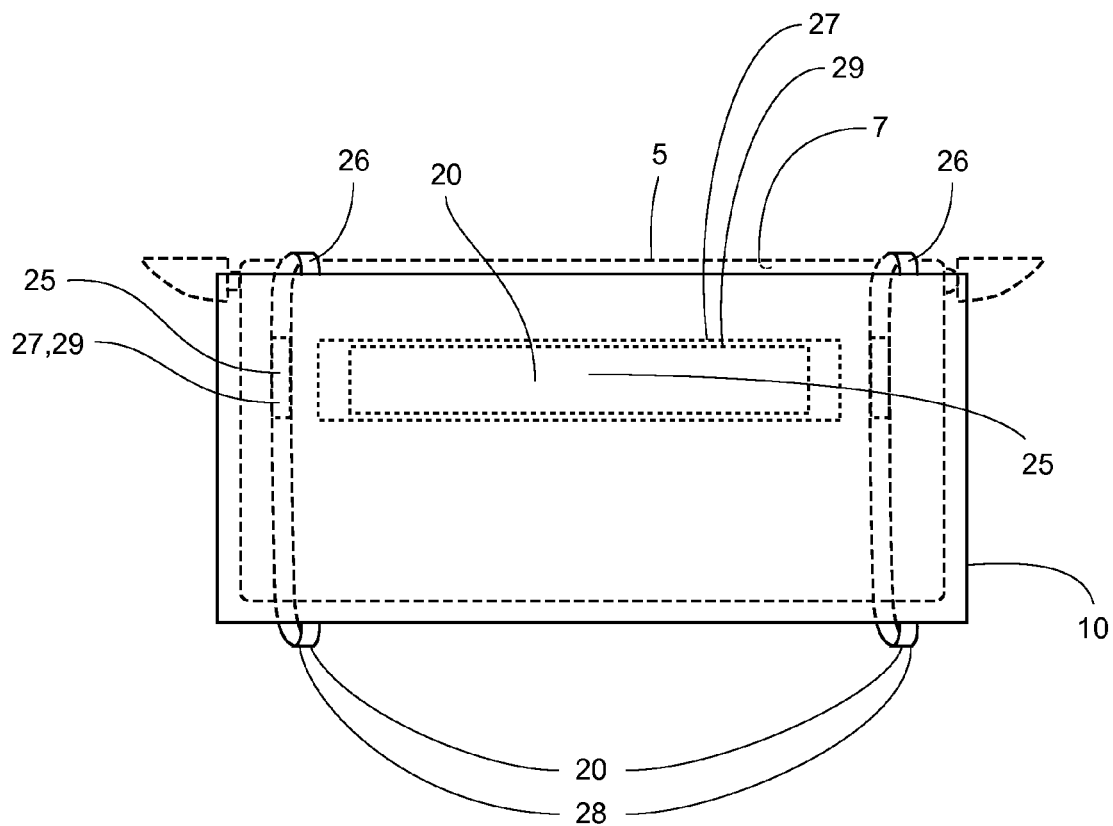
FIG. 1 is a front view of a multidirectional auxiliary sun visor removably secured to an existing vehicular sun visor using a securing device.
Figure 5:
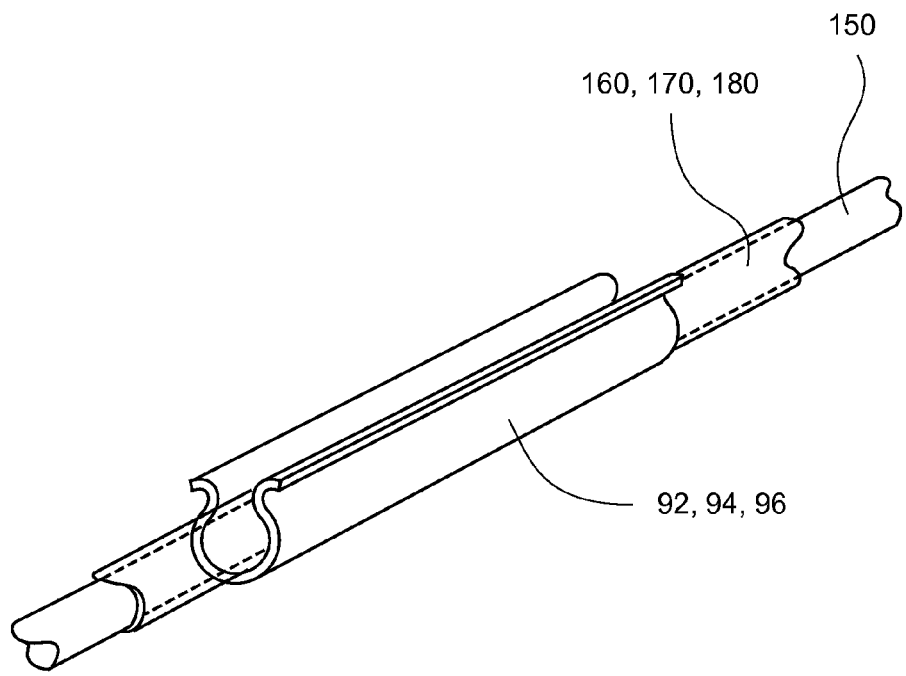
FIG. 5 is a perspective view of a pivot clip depicting a horse-shoe shape dimensioned to receive a cylindrical rail.

DETAILED DESCRIPTION OF THE PREFERRED AND SELECTED ALTERNATE EMBODIMENTS OF THE INVENTION

In describing the preferred and selected alternate embodiments of the present invention, as illustrated in FIGS. 1-5, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-5, the preferred embodiment is multidirectional auxiliary sun visor 10 having generally rectangular main panel 30 (best shown in FIG. 2) comprising left horse-shoe shaped pivot clip 92, bottom horse-shoe shaped pivot clip 93, and right horse-shoe shaped pivot clip 94 and folding panel 100, wherein folding panel 100 comprises U-shaped frame 140, and wherein folding panel 100 comprises left edge 110, bottom edge 120, and right edge 130, and wherein folding panel 100 is pivotable in three directions. Further, multidirectional auxiliary sun visor 10 comprises securing device 20 (best shown in FIG. 1) for removably securing multidirectional auxiliary sun visor 10 to an existing vehicular sun visor 5.

Main panel 30 comprises top side 40, left side 50, bottom side 60, right side 70, front side 80 and rear side 85 (best shown in FIGS. 2-3) wherein at least one pivot clip 92, 94, 96 is disposed on each of left side 50, bottom side 60, and right side 70, respectively. It will be recognized by those skilled in the art that frame 140 could extend around the entire periphery of folding panel 100 and pivot clips could be disposed on top side 40.

Frame 140 is generally U-shaped, and is disposed substantially along its full dimension proximate to and secured to left edge 110, right edge 130, and bottom edge 120 of folding panel 30. Further, frame 140 comprises cylindrical rails 150 (best shown in FIG. 4), wherein horse-shoe shaped pivot clips 92, 94, 96 are dimensioned to receive and removably retain cylindrical rails 150.

Folding panel 100 further comprises left stiffening member 160, bottom stiffening member 170, and right stiffening member 180, wherein stiffening members 160, 170, 180 are disposed on cylindrical rails 150, and wherein stiffening members 160, 170, 180 bind, grip or tighten the rotation of cylindrical rails 150 within their respective pivot clips 92, 94, 96, wherein pivot clips 92, 94, 96 are dimensioned to receive cylindrical rails 150 with stiffening members 160, 170, 180 thereon, and wherein stiffening members 160, 170, 180 reduce the tendency of cylindrical rails 150 to pivot within pivot clips 92, 94, 96, respectively.

Securing device 20 for securing multidirectional auxiliary sun visor 10 to vehicle sun visor 5 comprises hook-and-loop fasteners 25 (best shown in FIG. 1), wherein hook-and-loop fasteners 25 comprise cooperative halves 27, 29 that removably secure multidirectional auxiliary sun visor 10 to vehicular sun visor 5.

In a preferred embodiment, the cooperative halves or parts 27, 29 of hook-and-loop fastener 25 are disposed on separate upper strap member 26 and lower strap member 28, respectively, wherein strap members 26, 28 pass behind existing sun visor 5, and wherein halves 27, 29 of hook-and-loop fastener are cooperatively secured together, thereby removably securing multidirectional auxiliary sun visor 10 to existing sun visor 5.

Figure 2:
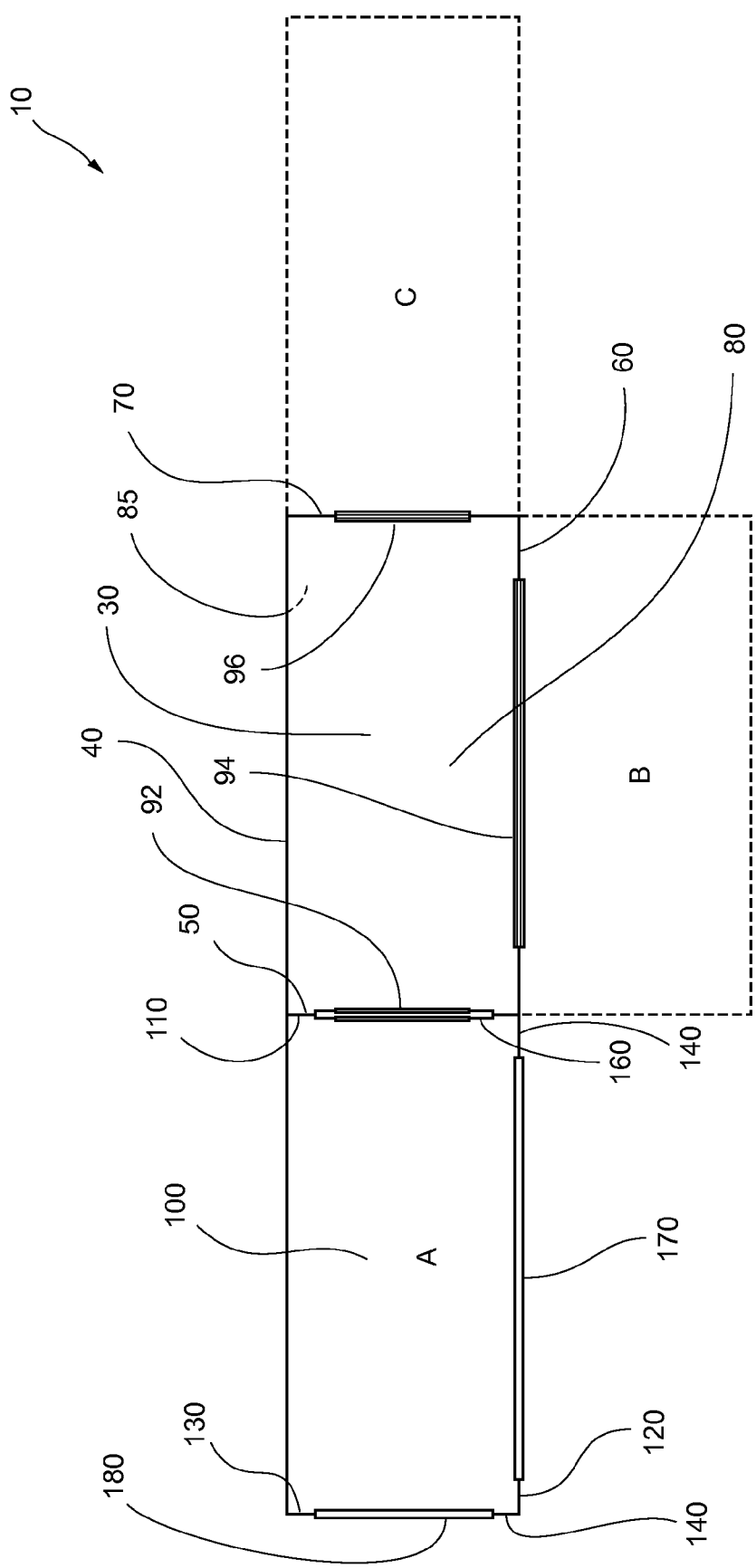
FIG. 2 is a front view of a multidirectional auxiliary sun visor depicting a folding panel selectively pivoted on a left side of a main panel (position "A"), further depicting alternative position "B" and position "C"

In an alternate embodiment best shown in FIGS. 1-2, first half 27 of hook-and loop fastener 25 is secured to front portion 7 of existing sun visor 5 and second half 29 of hook-and-loop fastener 25 is secured to rear portion 85 of main panel 30, wherein first half 27 of hook-and loop fastener 25 and second half 29 of hook-and-loop fastener 25 cooperatively engage to removably secure multidirectional auxiliary sun visor 10 to existing sun visor 5.

Figure 3:
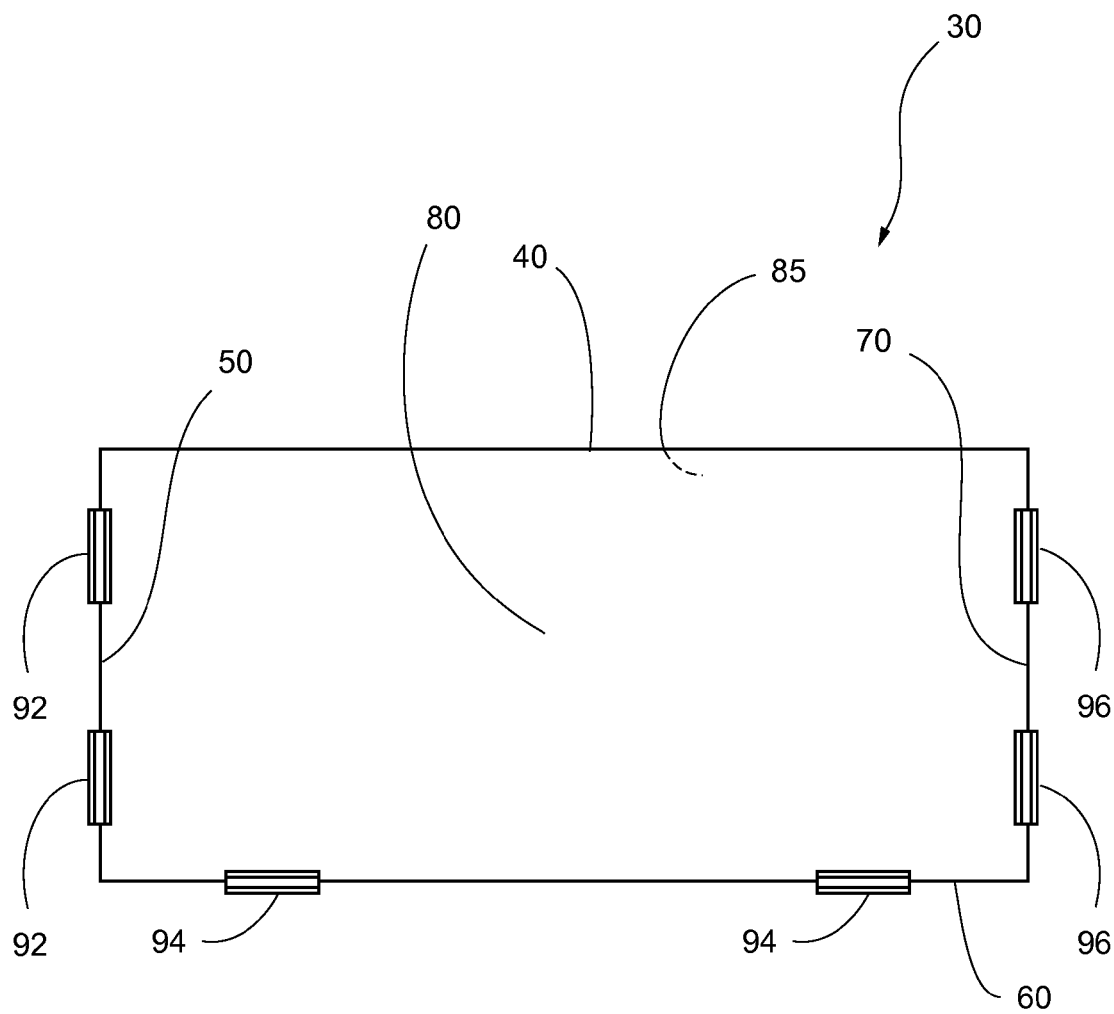
FIG. 3 is a detailed front view of a folding panel depicting a U-shaped frame and cylindrical rails on a left edge, bottom edge, and right edge of the folding panel.
Figure 4:
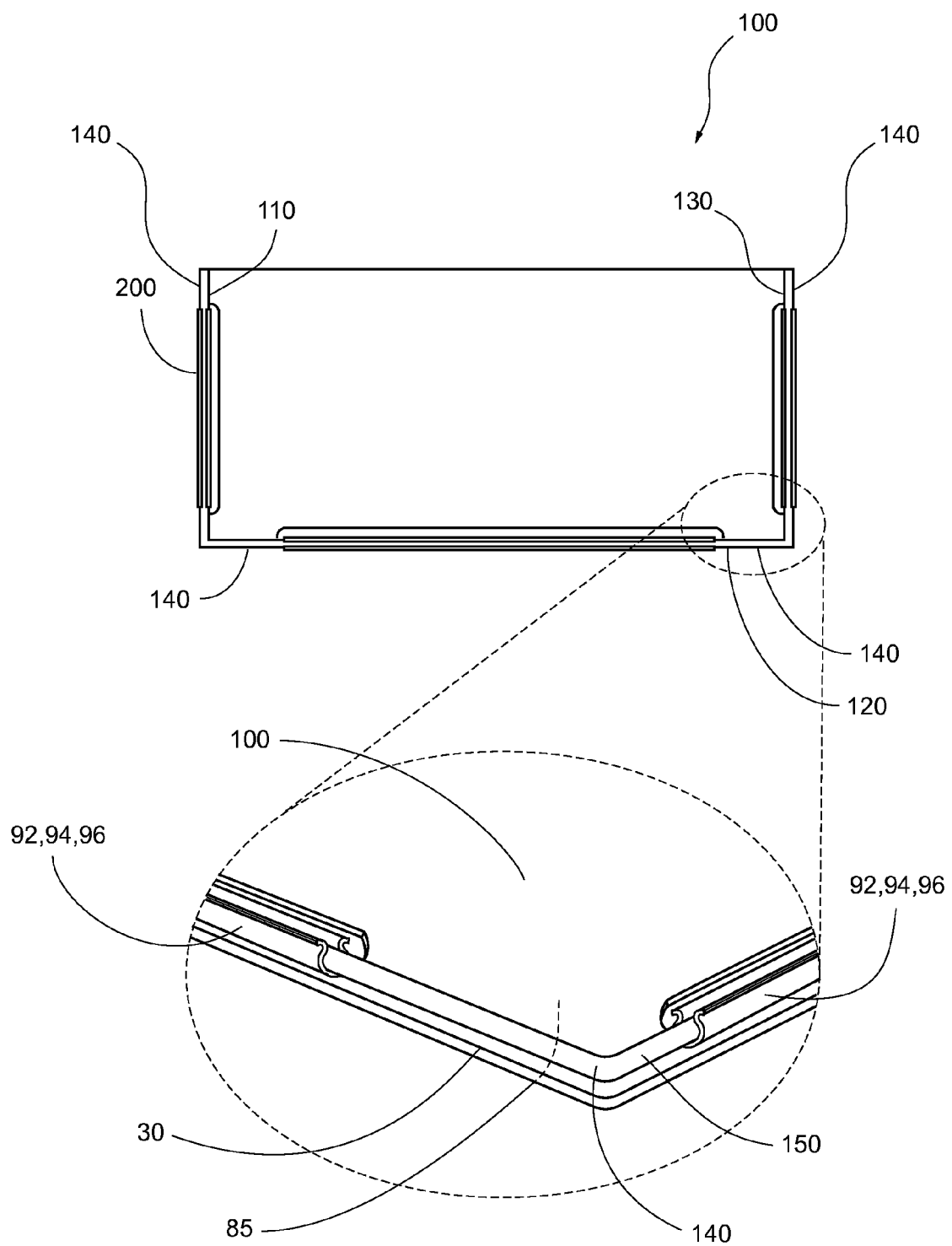
FIG. 4 is a detailed front view of a main panel depicting a plurality of pivot clips along a left side, bottom side, and right side of the main panel.

Referring now specifically to FIGS. 2-4, at least two pivot clips are selected from pivot clips disposed on left side 92, pivot clips disposed on bottom side 94, and pivot clips disposed on right side 96 of main panel 30, and cylindrical rails 150 are unclipped from the selected pivot clips, wherein folding panel 100 pivots in a selected direction determined by the remaining pivot clip. Selected directions may be to the left of main panel 30 (position "A"), to the bottom of main panel 30 (position "B"), or to the right of a main panel 30 (position "C").

That is, by removing cylindrical rail 150 from pivot clips 92, 94, folding panel 100 may be positioned to the right of main panel 30 (position "C"); by removing cylindrical rail 150 from pivot clips 94, 96, folding panel 100 may be positioned to the left of main panel 30 (position "A"); and, by removing cylindrical rail 150 from pivot clips 92, 96, folding panel 100 may be positioned below main panel 30 (position "B").

Referring now more particularly to FIG. 1, in use, multidirectional auxiliary sun visor 10 is removably secured to existing vehicular sun visor 5 utilizing securing device 20, such as, for exemplary purposes only and without limitation, hook-and-loop fasteners 25. It will be recognized by those skilled in the art that means other than hook-and-loop fasteners could be utilized to secure multidirectional auxiliary sun visor to existing vehicular sun visor 5, such as, for exemplary purposes only and without limitation, elastic bands or elastic straps.

An alternative embodiment comprises multidirectional auxiliary sun visor 10 removably secured to existing sun visor 5 via securing device 20 via hook-and-loop fasteners 25, wherein main panel 30 comprises U-shaped frame 140 having cylindrical rails 150 disposed along substantially the full dimension of three sides 50, 60, 70 of main panel 30. Cylindrical rails 150 may further comprise stiffening members 160, 170, 180 that bind, grip or tighten cylindrical rails 150 within pivot clips 92, 94, 96, respectively, to reduce the tendency of cylindrical rails 150 to pivot within pivot clips 92, 94, 96. Folding panel 100 comprises pivot clips 92, 94, 96 disposed on at least three peripheral edges, including left edge 110, bottom edge 120, and right edge 130. Pivot clips 92, 94, 96 are dimensioned to receive and removably retain cylindrical rails 150 of U-shaped frame 140. A number of pivot clips to unclip are selected from at least two of left pivot clip 92, bottom pivot clip 94, and right pivot clip 96 of folding panel 100, thereby allowing folding panel 100 to be manually positioned according to remaining pivot clips as set forth hereinabove for the preferred embodiment, thereby protecting the occupant from sun glare entering the vehicle at the selected position of folding panel 100.

A further alternative embodiment may comprise multidirectional auxiliary sun visor 10 having a number of pivot clips 92, 94, 96 disposed on at least three peripheral sides of existing sun visor 5, including optionally top side 40, left side 50, bottom side 60, and right side 70, wherein pivot clips 92, 94, 96 are dimensioned to receive and removably retain cylindrical rails 150 of U-shaped frame 140, and wherein U-shaped frame is disposed along its full dimension substantially proximate folding panel 100. Further, cylindrical rails 150 may comprise stiffening members 160, 170, 180 that bind, grip or tighten cylindrical rails 150, thereby reducing the tendency of cylindrical rails 150 to rotate within pivot clips 92, 94, 96. A number of pivot clips may be selected to unclip cylindrical rail 150 from at least two of left pivot clip 92, bottom pivot clip 94, and right pivot clip 96 of existing sun visor 5, thereby allowing folding panel 100 to be manually positioned according to remaining pivot clips, thereby protecting the occupant from sun glare entering the vehicle at the selected position of folding panel 100. It will be recognized that in this alternated embodiment, existing sun visor 5 serves as main panel 30, thereby obviating the need for a separate main panel 30.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method.

Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A multidirectional auxiliary sun visor comprising:
   a main panel, wherein said main panel is generally rectangular;
   a folding panel; and
   horseshoe-shaped pivot clips that operatively couple with a rotatable rod member, wherein said rotatable rod member comprises a portion of a cylindrical rail of a U-shaped frame, and wherein said pivot clips are disposed on at least three orthogonal edges of said main panel.

2. The multidirectional auxiliary sun visor of claim 1, wherein said pivot clips are dimensioned to receive said cylindrical rail.

3. The multidirectional auxiliary sun visor of claim 2, further comprising stiffening members, wherein said stiffening members are disposed on said cylindrical rail.

4. A multidirectional auxiliary sun visor comprising:
   a main panel;
   a folding panel, wherein said folding panel comprises a left edge, a right edge and a bottom edge; and
   horseshoe-shaped pivot clips that operatively couple with a rotatable rod member, wherein said rotatable rod member comprises a portion of a cylindrical rail of a U-shaped frame, and wherein said pivot clips are dimensioned to receive said cylindrical rail, and wherein said U-shaped frame comprises a full dimension defined by said cylindrical rail and is disposed along said full dimension proximate to, and secured to, said left, right and bottom edges of said folding panel.

5. The multidirectional auxiliary sun visor of claim 4, further comprising a means for securing said sun shielding visor to a vehicle sun visor.

6. The multidirectional auxiliary sun visor of claim 5, wherein said means for securing comprises hook-and-loop fasteners.

7. The multidirectional auxiliary sun visor of claim 6, wherein said multidirectional auxiliary sun visor comprises strap members that pass behind the vehicle sun visor, and wherein said strap members are secured together via said hook-and-loop fasteners.

8. The multidirectional auxiliary sun visor of claim 6, wherein said hook-and-loop fasteners are secured on the vehicle sun visor.

9. The multidirectional auxiliary sun visor of claim 3, wherein said pivot clips are dimensioned to receive said stiffening members, and wherein, said stiffening members reduce the tendency of said cylindrical rail to pivot within said pivot clips.

10. A multidirectional auxiliary sun visor comprising:
    a main panel;
    a folding panel; and
    horseshoe-shaped pivot clips that operatively couple with a rotatable rod member, wherein said rotatable rod member comprises a portion of a cylindrical rail of a U-shaped frame, wherein said main panel comprises a top side, a bottom side, a left side and a right side, and wherein at least one each of said pivot clips is disposed on said bottom side, said left side and said right side of said main panel.

11. A multidirectional auxiliary sun visor comprising:
    a main panel;
    a folding panel; and
    horseshoe-shaped pivot clips that operatively couple with a rotatable rod member, wherein said rotatable rod member comprises a portion of a cylindrical rail of a U-shaped frame, wherein said main panel comprises a top side, a bottom side, a left side and a right side, and wherein two each of said pivot clips are disposed on said bottom side, said left side and said right side of said main panel.

12. A method of shielding a vehicle occupant from sunlight, said method comprising the steps of:
    securing a multidirectional auxiliary sun visor having a frame, a main panel and a folding panel to a vehicular sun visor, wherein said folding panel is pivotable in three directions, and wherein said folding panel comprises a pivot clip on each of three orthogonal sides of said folding panel;
    unclipping said folding panel from at least two of said pivot clips that are operatively coupled with a rotating rod member, wherein said pivot clips are disposed on at least two sides selected from a group consisting of a bottom side, a left side and a right side of said main panel; and
    pivoting said folding panel within the remaining pivot clip in a direction determined by the selection of the remaining pivot clip.

13. The method of claim 12, wherein said step of securing further comprises the step of:
    removably securing said multidirectional auxiliary sun visor to the vehicular sun visor via at least one hook-and-loop fastener.

14. The method of claim 13, wherein said step of removably securing further comprises the step of:
    removably securing said multidirectional auxiliary sun visor on a front surface of the vehicular sun visor via said at least one hook-and-loop fastener, wherein said at least one hook-and-loop fastener comprises a first half secured to said front surface and a second half secured to said multidirectional auxiliary sun visor.

15. The method of claim 13, wherein said step of removably securing further comprises the step of:
    removably securing said multidirectional auxiliary sun visor around the vehicular sun visor via said at least one hook-and-loop fastener, wherein said at least one hook-and-loop fastener comprises cooperative halves, and wherein said multidirectional auxiliary sun visor comprises strap members that pass behind the vehicular sun visor, and wherein said strap members are secured together via said cooperative halves of said at least one hook-and-loop fastener.

16. A sun shield comprising:
    a generally U-shaped frame comprising frame rails having stiffeners thereon;
    a main panel having horseshoe-shaped clips disposed on at least three of the peripheral edges of said main panel, wherein said clips are dimensioned to receive said frame rails having said stiffeners thereon; and
    a folding panel, wherein said folding panel is pivotable in three directions.

17. The sun shielding visor of claim 16, wherein said horseshoe-shaped clips are dimensioned to receive said frame rails.

18. The sun shielding visor of claim 16, wherein said main panel comprises hook-and-loop fasteners for securing said main panel to an existing vehicular sun visor.

* * * * *